United States Patent [19]

Eberhard et al.

[11] 4,249,066

[45] Feb. 3, 1981

[54] PRESS PLATEN FOR BELT PRESS

[75] Inventors: Rolf Eberhard, Schalksmühle-Heedfeld; Ulrich Maiwurm, Iserlohn, both of Fed. Rep. of Germany

[73] Assignee: Wagener & Co., Schwelm, Fed. Rep. of Germany

[21] Appl. No.: 927,970

[22] Filed: Jul. 26, 1978

[30] Foreign Application Priority Data

Jul. 29, 1977 [DE] Fed. Rep. of Germany ....... 2734252

[51] Int. Cl.³ .............................................. H05B 1/00
[52] U.S. Cl. .................................. 219/243; 219/505; 338/260; 338/295; 338/320
[58] Field of Search .............. 219/243, 251, 228, 504, 219/505, 457, 466; 338/22 R, 23, 295, 260, 328, 320; 29/611, 612

[56] References Cited

U.S. PATENT DOCUMENTS

| 2,606,986 | 8/1952 | Sweger | 338/25 |
| 3,286,077 | 11/1966 | Radford et al. | 219/251 |
| 3,319,045 | 5/1967 | Tucker | 219/243 |
| 3,444,732 | 5/1969 | Robbins et al. | 219/243 |
| 3,467,817 | 9/1969 | Fricker | 219/501 |
| 3,953,711 | 4/1976 | Eck et al. | 219/505 X |

Primary Examiner—C. L. Albritton
Attorney, Agent, or Firm—Karl F. Ross

[57] ABSTRACT

A press platen has a press plate and a cover plate between which is sandwiched a heater plate formed with a generally uniform array of cylindrical recesses in each of which is received an electrically energizable heater capsule. The heater plate is electrically but not thermally insulated and conductor foils applied to opposite faces of this plate but insulated from the press and cover plates are connectable to a source of electricity for energizing the heater capsules.

9 Claims, 5 Drawing Figures

PRESS PLATEN FOR BELT PRESS

Field of the Invention

The present invention relates to a press platen. More particularly this invention concerns such a platen usable in a belt press.

BACKGROUND OF THE INVENTION

A belt press, such as described in the commonly assigned and copending application Ser. No. 927,924 (now U.S. Pat. No. 4,187,776 has a pair of platens which are pressed against opposite sides of a conveyor or transport belt, either to repair same, or in the manufacturing or joining together of the ends of such a belt. Such platens must be heated to a treatment temperature, which is in the case of a rubber-type belt the vulcanization temperature of the rubber, and in the case of a synthetic-resin belt the hardening or softening temperature for the resin.

Such a press platen is normally flat and rectangular, trapezoidal, parallelogrammatic or rhombic. Each platen normally has a stiffening frame of profiled bars provided if necessary with a diagonal stiffening member. The platen is heated by means of resistance wires embedded in a heater plate that is laminated with a press plate and forms therewith the press platen.

It is essential that the press platen be uniformly heated. The heat-treating operation carried out by a press platen in a belt press is relatively delicate, with uniform heating of the belt being treated being absolutely essential.

The known press platens are constructed with extreme care in order to achieve this uniformity. The distribution of the heaters is carefully calculated, and frequently extremely complex control arrangements are provided to ensure uniform heating. It is also necessary to provide a complex energizing circuit, as the relationship of the temperature of the heater to its resistance varies with temperature in a nonlinear and often relatively complex manner. This variation often requires the use of feedback-employing control circuits which operate relatively complex variable power supplies.

OBJECTS OF THE INVENTION

It is therefore an object of the present invention to provide an improved heated press platen.

Another object is to provide such a platen which is particularly usable in a belt press.

Another object is provision of a press platen which can be uniformly heated using relatively simple heaters and control means.

SUMMARY OF THE INVENTION

This is attained in accordance with the instant invention in a press platen having a heater plate and press plate as described above, but wherein the heater plate is formed with an array of recesses regularly spaced apart in two generally perpendicular directions. Each recess receives a respective heater capsule or pill of the type which becomes hot when electrically energized. The recesses and capsules may be spaced apart in a rectangular array, that is arrayed in parallel rows perpendicular to parallel courses. The spacing within the rows and between the courses may be identical, with according to this invention a somewhat closer spacing being used adjacent the edges of the press platen to compensate for heat dissipation at these edges.

This arrangement allows the press platen to be heated extremely uniformly. The heater plate is relatively uniformly heated by the capsules and stores and dissipates this heat so that the press plate itself is almost perfectly uniformly heated. When each heater capsule or pill is spaced 10 cm from the adjacent pills and has a heat capacity of 100 Watt it is possible according to this invention to very easily generate the desired treatment temperature within the press platen.

According to further features of this invention the recesses and capsules are complementary and cylindrical, and the heater plate is made of aluminum for maximum heat dissipation. Each of the heater pills is received in a respective recess and its two ends are exposed at the opposite faces of the heater plate. The plate in turn carries a dielectric coating or is laminated with dielectric sheets that leave exposed only these ends of the heater pills. It is then possible to overlay the opposite faces of the heater plate with conductive sheets that are then energized to pass electricity through the heater capsules and thereby energize same. One or both of the contact sheets or foils may be subdivided into several zones or strips for energization of the heater capsules with multiphase current, or for individual energization of the different zones with different voltages, although the latter expedient is not normally necessary.

The dielectric insulating layers may be constituted as an oxide coating on the aluminum heater plate, or by synthetic resin or mica sheeting. The heating capsules themselves can be made of different materials which heat when an electric current is passed through them. According to the invention cold conducting materials or PTC ceramics are employed. The use of such materials therefore makes it possible to produce the best platen according to the instant invention at a very low cost. Furthermore, these particular materials have a nearly constant resistance at least in the operating range, and in fact at the normally used operating range of between 100° C. and 200° C. the resistance of these materials does not change at all with temperature. Thus when the energization is maintained constant the operator can be ensured that the temperature will remain similarly constant. Furthermore, the use of such materials completely eliminates the possibility of sparking, so that the control circuit can be greatly simplified, and the press can be used in situations where fire hazard is present. Even when employed in the presence of flammable vapors or gases the complete absence of any sparking will make these press platens fully safe.

SPECIFIC DESCRIPTION

Figure 1:
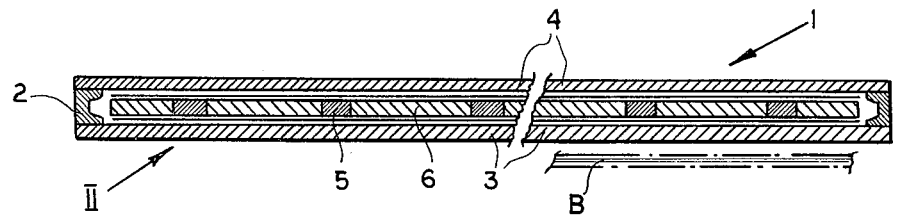
FIG. 1 is a vertical cross section through the press platen according to this invention.

As shown in FIG. 1 a press platen 1 for a belt press as described in the above-cited commonly assigned application, whose entire disclosure is herewith incorporated, comprises a frame 2 carrying on one side a steel press plate 3 engageable with a transport belt B to be treated and on the other side a steel cover plate 4. Heaters 5 are provided in a heater or distribution plate 6 sandwiched between the plates 3 and 4.

Figure 2:
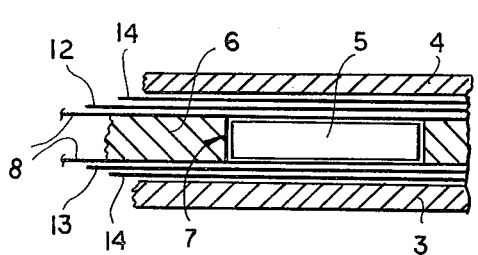
FIG. 2 is a large-scale view of the detail indicated at arrow II in FIG. 1.
Figure 3:
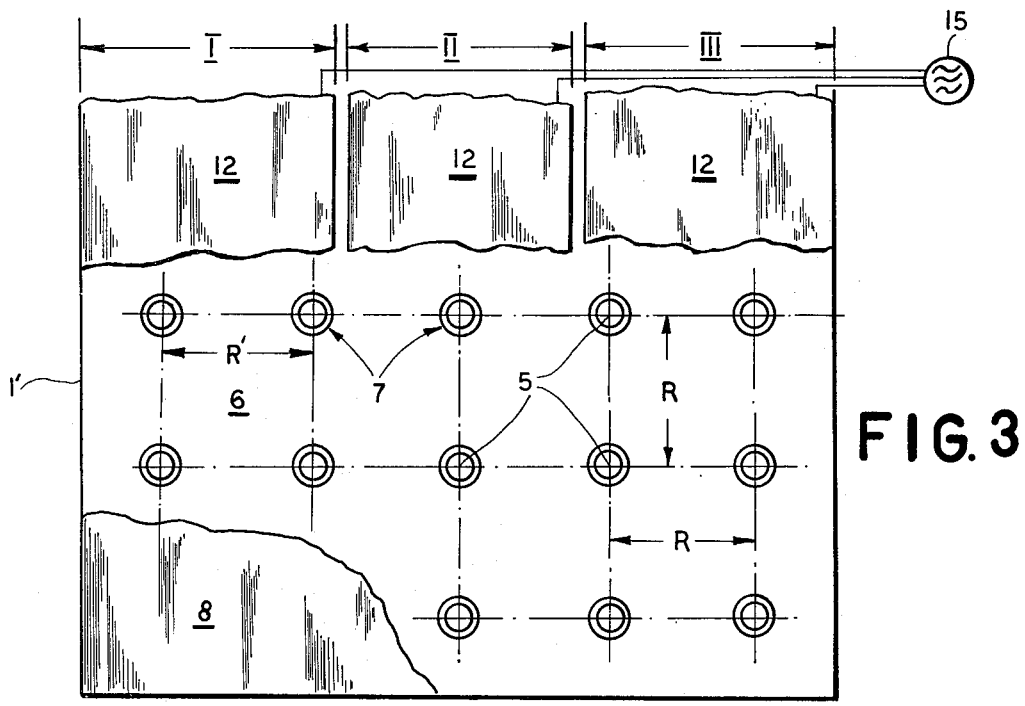
FIG. 3 is a top view of the press platen according to this invention.
Figure 4:
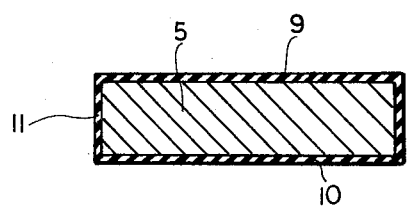
FIG. 4 is a large-scale sectional view through the heater capsule according to this invention.

As shown in more detail in FIGS. 2 and 3 the heater distribution plate 5 is formed with a multiplicity of throughgoing cylindrical holes 7, and each of the heaters 5 is a so-called heater pill or capsule of a cylindrical shape identical to that of the respective recess 7. These recesses 7 are arrayed in rows spaced apart by a distance R and courses spaced apart also by the distance R, although adjacent the edge 1' of the press plate the spacing R' may be reduced somewhat to compensate for heat loss.

The distributor or heater plate 6 is provided with a dielectric oxide or enamel coating 8 that, although having excellent electrical properties, does not act as a thermal insulator. The heater pills 5 have upper and lower ends forming electrically conducting contact surfaces 9 and 10, but the sides 11 are similarly coated with enamel or oxyde for electrical insulation. These pills 5 are made of PT ceramic.

The system is energized by a 3-phase voltage source 15 each of whose phases is connected to a respective upper conductor strip 12 in one of three zones I, II or III, and whose ground is connected to a lower conductive sheet 13. These sheets 12 and 13 are laid against the opposite faces of the plate and therefore make good contact with the ends 9 and 10. The source 15 is of the 3-phase y-type, although it is entirely within the scope of this invention to use a Delta-type source or other energizing power supply. Between the sheets 12 and 13 and the plates 4 and 3, respectively, are provided insulating sheets 14 which shield the conductor sheets 12 and 13 from the plates 4 and 3. Sheets 14 may be made of a synthetic resin, or of mica.

Figure 5:
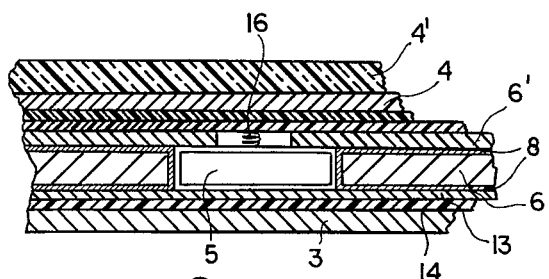
FIG. 5 is a view similar to FIG. 2 showing another arrangement according to this invention.

As shown in FIG. 5 it is possible to laminate another plate 6' to the plate 6 to increase the stiffness and heat distribution thereof, and to provide a spring 16 which bears axially against the pill 5 and insures good contact with the foils at 12 and 13. Also an insulating plate 4' may be applied atop the plate 4 to minimize heat loss.

The heater capsules 5 are as described above made of a cold conductor material or a PTC ceramic. They are so constituted that in the temperature range they are employed in their resistance R, which is a function of temperature T, has a slope dR/dT which is substantially equal to zero. In fact the heater pills constituted according to the instant invention can have such a flat gradient over the temperature ranges used for both synthetic-resin belts B or rubber belts B. The result is automatic self regulation with a constant feed voltage so that the provision of a complex feedback network to operate the power supply 15 becomes unnecessary.

The PTC (positive temperature coefficient) ceramic is a semiconductive cold conductor, e.g. barium titanate ($BaTiO_3$) whose resistance varies with temperature so that it is in the present application a self-regulating heater since with a fixed voltage its resistance will change to compensate for temperature change. Thus it will maintain a given temperature with a given voltage. This material is described in greater detail in volume 29, number (1977) of *Electrotechnische Zeitschrift*.

We claim:
1. A press platen comprising:
   a thermally conductive and rigid press plate;
   a thermally conductive and rigid heater plate having a surface juxtaposed closely with said press plate in heat-conducting relationship and formed with a generally regular array of recesses spaced apart in two generally perpendicular directions and opening at said surface;
   a heater capsule in each of said recesses; and
   means for passing electricity through each of said capsules for heating same and thereby heating said press plate.
2. The platen defined in claim 1 wherein said recesses are throughgoing generally cylindrical holes and said capsules are generally cylindrical and fit in said holes, said platen further comprising a cover plate sandwiching said heater plate with said press plate.
3. The platen defined in claim 2 wherein said heater plate has faces and said capsules have ends exposed at said faces, said means comprising one conductor at one of said faces contacting the respective ends and another conductor at the other of said faces contacting the respective ends.
4. The platen defined in claim 3 wherein said conductors are conductive sheets overlying the respective faces.
5. The platen defined in claim 4, further comprising a layer of insulating material between said sheets and said heater plate.
6. The platen defined in claim 5 wherein said layer is a coating of said insulating material on said heater plate at said faces and in said holes.
7. The platen defined in claim 4 wherein said one conductor is subdivided into a plurality of zones insulated from one another.
8. The platen defined in claim 1 wherein said heater capsules are of a PTC ceramic.
9. The platen defined in claim 1 wherein said heater capsules have a resistance (R) dependent on temperature (T) and are adapted for use in a predetermined temperature range wherein dR/dT is generally equal to 0.

* * * * *